106. COMPOSITIONS, COATING OR PLASTIC.

Patented Aug. 31, 1937

2,091,325

UNITED STATES PATENT OFFICE 2,091,325

PRODUCTION OF CASEIN GLUE AND CASEIN GLUE PREPARATION

Walther Luetzkendorf, Mannheim, Germany, assignor to I. G. Farbenindustrie Aktiengesellschaft, Frankfort-on-the-Main, Germany No Drawing. Application May 10, 1934, Serial No. 724,943. In Germany May 17, 1933

15 Claims. (Cl. 134—23.9)

The present invention relates to the production of casein glue and casein glue preparations.

It has already been proposed to prepare casein glue by decomposing casein with alkaline agents, such as sodium hydroxide, carbonate or phosphate, borax, waterglass, lime, or ammonia. The glue prepared in accordance with these known processes usually has a good sticking power which it loses, however, within a short time, often even after a few hours, by reason of its poor stability.

I have now found that by decomposing casein with alkali silicates, more especially sodium or potassium silicates, which consist essentially of alkali metasilicate in which the alkaline oxide and silicic acid are in the approximate ratio of 1:1, and of free hydroxide of the alkali, and are prepared in accordance with the British Patent Specification No. 391,407, Apr. 27, 1933, by heating silica (such as quartz sand) with an alkali lye, of commercial or lower concentration, up to temperatures of say about 220° to about 230° C. at which the temporarily pasty mass crumbles to powder, whereupon heating may be continued up to a temperature of about 250° to 300° C. in a rotary drum or a stirring apparatus, the product, if so desired, being dissolved in water, freed from residue and retransformed into the solid condition by concentrating or spray-drying the solution, a glue is obtained which is free from the disadvantage of slight stability.

By mixing casein with the said alkali silicates dry preparations are obtained which, by the addition of water, yield most valuable glues; these dry preparations are accordingly also within the scope of my present invention.

As a rule only comparatively small amounts, from about 10 to about 15 per cent by weight of the casein employed, of the decomposing agent are required, the injuriously high alkalinity of the casein glue usual when employing the usual decomposing agents which are generally speaking employed in amounts of from 20 to 40 per cent of the casein being thus avoided.

The casein glue prepared according to my invention may, if so desired, be incorporated with other additions usual in the preparation of glue, such as lime, for accelerating the setting of the glue, coloring matters, fillers, such as chalk, or softening agents, such as triethanolamine. It may be employed for all purposes for which casein glue has hitherto been employed, as for example in hot and cold glueing or as a binding agent for paints or the like.

A quick setting and highly waterproof casein glue is obtained by adding to a glue of the kind described above quicklime and/or seralbumin. Glues of the latter kind are especially suitable in the manufacture of plywood and other joined wooden articles in a heated hydraulic press.

The following examples will further illustrate how my present invention may be carried out in practice but the invention is not restricted thereto.

Example 1

20 parts of casein are allowed to swell for a short time, say 20 to 30 minutes, in 40 parts of water, a solution of 3 parts of sodium silicate consisting essentially of sodium metasilicate in which the sodium oxide and silicic acid are in the approximate ratio of 1:1, and of free hydroxide of sodium, which is prepared in accordance with Example 1 of the British Patent Specification No. 391,407 in 37 parts of water being then added. After allowing the admixed material to stand for about 10 to about 20 minutes, the glue is ready for use.

Example 2

20 parts of casein are mixed with 3 parts of the sodium silicate of Example 1. A dry preparation is thus obtained which yields a casein glue ready for use a short while after adding 80 parts of water.

Example 3

18 parts of casein are allowed to swell for about 15 to 25 minutes in 40 parts of water, a solution of 1 part of sodium silicate of Example 1, to which 2 parts of quicklime have been added, being then admixed. The casein glue prepared in this manner is excellently suited for the manufacture of plywood in a heated hydraulic press as it sets very quickly and produces a highly waterproof plywood.

Example 4

A casein glue showing similar good qualities is obtained by allowing a mixture of 16 parts of casein and 4 parts of seralbumin in 50 parts of water to swell for 30 minutes, and adding a solution of 2 parts of the sodium silicate used in the foregoing examples in 28 parts of water.

Example 5

A mixture of 16 parts of casein and 4 parts of seralbumin is allowed to swell for about 15 to 30 minutes in 50 parts of water, a solution of 1.8 parts of the sodium silicate of Example 1, in 27 parts of water having added thereto 1.2 parts of quicklime, being then added.

What I claim is:

1. A process for the production of casein glues which consists in decomposing casein by admixing therewith alkali metal silicate consisting essentially of an alkali metal metasilicate in which the alkaline oxide and silicic acid are in the approximate ratio of 1:1 and of an admixture of about 10 to 15 percent of free hydroxide of the alkali metal.

2. A process for the production of casein glues which consists in decomposing casein by admixing therewith sodium silicate consisting essentially of sodium metasilicate in which the sodium oxide and silicic acid are in the approximate ratio of 1:1 and of an admixture of about 10 to 15 per cent of free hydroxide of sodium.

3. A process for the production of casein glues which consists in decomposing casein by admixing therewith from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium.

4. A process for the production of casein glues which consists in decomposing casein by admixing therewith from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium, and incorporating therewith other additions usual in the preparation of glue.

5. A process for the production of casein glues which consists in decomposing casein by admixing therewith from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium and incorporating therewith an agent capable of accelerating the setting of the glue.

6. A process for the production of casein glues which consists in decomposing casein by admixing therewith from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium, in which process the casein and the sodium silicate are first mixed in a dry condition, whereafter water is added.

7. A casein glue prepared by decomposing casein with an alkali metal silicate consisting essentially of an alkali metal metasilicate in which the alkaline oxide and silicic acid are in the approximate ratio of 1:1 and of an admixture of about 10 to 15 per cent of free hydroxide of the alkali metal.

8. A casein glue prepared by decomposing casein with a sodium silicate consisting essentially of sodium metasilicate in which the sodium oxide and silicic acid are in the approximate ratio of 1:1 and of an admixture of about 10 to 15 per cent of free hydroxide of sodium.

9. A casein glue prepared by decomposing casein with from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium.

10. A casein glue prepared by decomposing casein with from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium and being incorporated with other additions capable of accelerating the setting of glue.

11. A casein glue prepared by decomposing casein with from about 10 to about 15 per cent by weight of the casein employed of a sodium silicate consisting essentially of sodium metasilicate in which the sodium oxide and silicic acid are in the approximate ratio of 1:1 and of an admixture of about 10 to 15 per cent of free hydroxide of sodium and being incorporated with quicklime.

12. A casein glue prepared by decomposing casein with from about 10 to about 15 per cent by weight of the casein employed of a sodium metasilicate in which the sodium oxide and silicic acid are in the approximate ratio of 1:1 and of an admixture of about 10 to 15 per cent of free hydroxide of sodium and being incorporated with seralbumin.

13. A casein glue prepared by decomposing casein with from about 10 to about 15 per cent by weight of the casein employed of a sodium metasilicate in which the sodium oxide and silicic acid are in the approximate ratio of 1:1 and of an admixture of about 10 to 15 per cent of free hydroxide of sodium and being incorporated with quicklime and seralbumin.

14. A casein glue preparation comprising a mixture of casein and an alkali metal silicate consisting essentially of an alkali metal metasilicate in which the alkaline oxide and silicic acid are in the approximate ratio of 1:1 and of an admixture of about 10 to 15 per cent of free hydroxide of the alkali metal.

15. A casein glue preparation comprising a mixture of casein and a sodium silicate consisting essentially of sodium metasilicate in which the sodium oxide and silicic acid are in the approximate ratio of 1:1 and of an admixture of about 10 to 15 per cent of free hydroxide of sodium.

WALTHER LUETZKENDORF.